(12) United States Patent
Spierts et al.

(10) Patent No.: US 9,545,113 B2
(45) Date of Patent: Jan. 17, 2017

(54) PROCESSING A MASS OF PUMPABLE FOODSTUFF MATERIAL

(75) Inventors: Leon Spierts, PD Maastricht (NL); Thomas W. Dekker, BE Nijmegen (NL); Martinus J. W. Van Zoelen, VH Den Bosch (NL)

(73) Assignee: Marvell Townsend Further Processing B.V. (NL)

( * ) Notice: Subject to any disclaimer, the term of this patent is extended or adjusted under 35 U.S.C. 154(b) by 284 days.

(21) Appl. No.: 14/126,151

(22) PCT Filed: Jun. 15, 2012

(86) PCT No.: PCT/NL2012/050422
§ 371 (c)(1),
(2), (4) Date: Apr. 15, 2014

(87) PCT Pub. No.: WO2012/173482
PCT Pub. Date: Dec. 20, 2012

(65) Prior Publication Data
US 2014/0212558 A1   Jul. 31, 2014

(30) Foreign Application Priority Data
Jun. 17, 2011   (NL) .................................. 2006958

(51) Int. Cl.
*A22C 7/00* (2006.01)
*A22C 11/02* (2006.01)
(Continued)

(52) U.S. Cl.
CPC .............. *A22C 7/0084* (2013.01); *A22C 7/00* (2013.01); *A22C 7/0069* (2013.01); *A22C 11/02* (2013.01);
(Continued)

(58) Field of Classification Search
CPC ....... A22C 7/00; A22C 7/0069; A22C 7/0084; A22C 11/08; A22C 11/02; A23L 1/3175; A23L 1/3177
(Continued)

(56) References Cited

U.S. PATENT DOCUMENTS 3,098,747 A * 7/1963 Dubil ....................... A22C 7/00
426/478
3,599,556 A    8/1971 Madsen
(Continued)

FOREIGN PATENT DOCUMENTS

| DE | 2033537 A1 | 4/1972 |
| WO | WO-0030458 A1 | 6/2000 |
| WO | WO-2004002229 A2 | 1/2004 |

OTHER PUBLICATIONS

Netherlands Search Report dated Jan. 13, 2012, filed in NL Application No. 2006958, 14 pages.
(Continued)

*Primary Examiner* — David Angwin
*Assistant Examiner* — John J Norton
(74) *Attorney, Agent, or Firm* — Blank Rome LLP

(57) ABSTRACT

A method and installation for processing a mass of pumpable foodstuff material, for example a ground meat mass. The installation comprises a hopper and a positive displacement pump having an inlet and an outlet. A tube structure connects to the outlet of the pump and has a mouth, e.g. leading to a molding device or a sausage machine. A controllable vacuum assembly causes controlled evacuation of air from the mass in the trajectory of the mass from the hopper to a pump chamber. A controllable aeration assembly causes controlled introduction of a gas into the mass at one or more locations in the trajectory of the mass between the pump outlet and the mouth. A gas pressure control device introduces gas into the mass at a controlled pressure that is
(Continued)

at least equal to the actual pressure of the mass at the location of introduction of the gas.

20 Claims, 8 Drawing Sheets

(51) Int. Cl.
    *A23L 1/317*       (2006.01)
    *A22C 11/08*     (2006.01)

(52) U.S. Cl.
    CPC ............... *A22C 11/08* (2013.01); *A23L 13/65* (2016.08); *A23L 13/67* (2016.08)

(58) Field of Classification Search
    USPC ........ 426/513, 518, 519; 452/35, 40; 99/472
    See application file for complete search history.

(56) References Cited

U.S. PATENT DOCUMENTS

| | | | |
|---|---|---|---|
| 3,733,653 A | | 5/1973 | Javaloy et al. |
| 4,205,415 A | * | 6/1980 | Orchard .................. A22C 7/00 425/298 |
| 4,562,615 A | | 1/1986 | Anderson et al. |
| 4,723,581 A | * | 2/1988 | Staudenrausch ....... A22C 11/06 100/145 |
| 4,761,121 A | | 8/1988 | Battista et al. |
| 6,613,374 B1 | * | 9/2003 | Fayard .................... A23G 9/22 426/516 |
| 7,309,228 B2 | | 12/2007 | Lindee et al. |
| 2002/0012731 A1 | * | 1/2002 | van Esbroeck ........ A21C 11/00 426/512 |
| 2004/0155129 A1 | | 8/2004 | Le Paih |
| 2005/0220932 A1 | * | 10/2005 | van der Eerden ... A22C 7/0069 426/1 |
| 2006/0141107 A1 | * | 6/2006 | Schwimmer ....... A23C 19/0765 426/231 |
| 2007/0212994 A1 | | 9/2007 | Maile |
| 2009/0214730 A1 | * | 8/2009 | Garwood ............... A22C 17/00 426/315 |

OTHER PUBLICATIONS

International Search Report dated Oct. 11, 2012, filed in PCT Application No. PCT/NL2012/050422, 5 pages.

* cited by examiner

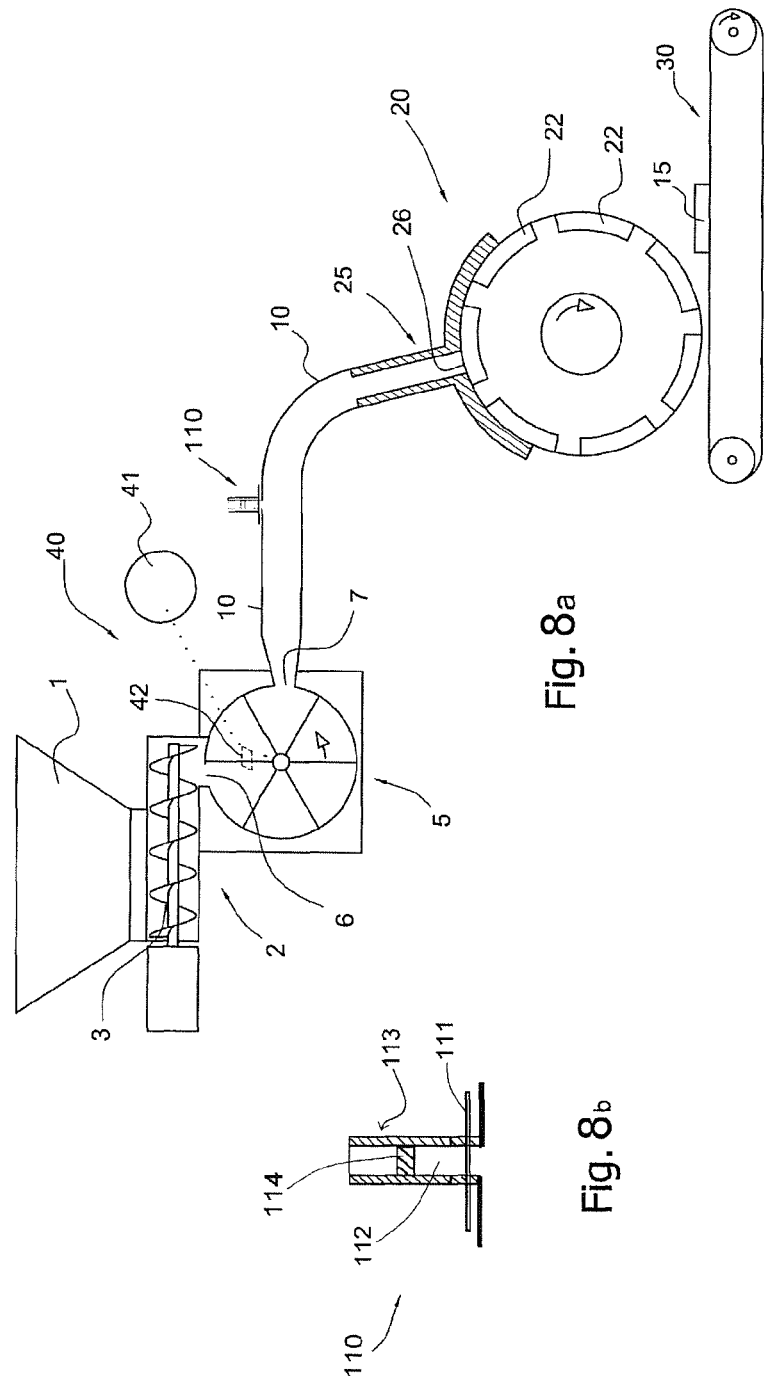

PROCESSING A MASS OF PUMPABLE FOODSTUFF MATERIAL

This Application is a National Phase of PCT/NL2012/050422, filed on Jun. 15, 2012, which claims the priority of Netherlands Application No. 2006958, filed on Jun. 17, 2011, the entire contents of both of which are hereby incorporated by reference.

FIELD OF THE INVENTION

The present invention relates to methods and installations for the processing of a mass of pumpable foodstuff material.

BACKGROUND OF THE INVENTION

For example from WO00/30458 and WO2004/002229 an installation is known for the production of shaped food products from a pumpable mass. This installation has a moulding device with a frame and a mould member having multiple mould cavities, each having a filling opening for the introduction of foodstuff material into the mould cavity. The mould member is movably supported by the frame, and a mould member drive is provided for moving the mould member along a path, the path including a fill position for filling the mass into a mould cavity and a product release position remote from the fill position for releasing a moulded product from the mould cavity.

In order to introduce a portion of the mass into a mould cavity, a mass feed member is supported by the frame and has a mouth at the fill position along the path of the mould member. The mass feed member is connected to a pump via a fill tube. The mass feed member is adapted to transfer the mass into a mould cavity of the mould member when the filling opening thereof is in communication with the mouth at the fill position.

The known installation also comprises a hopper that is adapted to receive a batch of the mass of pumpable foodstuff material, e.g. ground meat that is produced in a grinding process using a meat grinder. The mass is discharged from the hopper via a positive displacement pump that is positioned between the hopper and the fill tube to which the pump is connected. In general the pump has an inlet to receive mass from the hopper and an outlet connected to the fill tube. The pump forms one or more pump chambers that each are successively in communication with the pump inlet for the introduction of mass into the pump chamber and with the pump outlet for the discharge of mass from the pump chamber.

In the production of moulded food products with an installation of this type, e.g. for the production of shaped meat products from ground meat, e.g. from beef, pork, poultry meat, many properties of the finally obtained products are monitored as they are considered relevant. For example the weight of the moulded products lies desirably within narrow tolerances, e.g. for hamburger meat patties supplied to large fast-food establishments.

It is known to use—in the installation of the type discussed above—a controllable vacuum assembly that is adapted to cause evacuation of air that is dispersed and also available as (macro) air pockets within the mass, the evacuation taking place at one or more locations in the trajectory of the mass from and including the hopper to and including the pump chamber at a position where it is in communication with the pump inlet. For example it is known to use a combination of a positive displacement pump, e.g. a vane pump, and a vacuum pump, which combination is often part of a vacuum filler used for production of sausages, wherein a ground meat mass is stuffed into a sausage casing. The evacuation may already take place in the hopper, commonly the hopper being provided with a lid or access valve to allow the creation of a vacuum in the hopper filled with the mass. As an alternative, or in combination with evacuation of the hopper, it is known to create a vacuum in the pump, e.g. near the inlet of the positive displacement pump. e.g. such that the vacuum assists the flow of mass into the pump chamber via the inlet of the pump.

In the practice until now, as is also common for sausage production, the meat mass is evacuated as much as possible by the vacuum assembly. This is commonly done by the operator setting the vacuum to the highest level possible for a certain meat mass. It is noted that a relatively fluid meat mass requires a somewhat reduced level of vacuum as otherwise the meat mass is sucked into the vacuum assembly in an undesirable manner. This "complete evacuation" has as an advantage that the uniformity of the weight of the products is increased significantly and can be kept within relatively narrow tolerances compared to a non-evacuated meat mass.

Weight of the products is not the only parameter that is considered relevant for the products. For instance many parameters, such as texture, bite, juiciness of a meat product once it has been properly prepared for human consumption, e.g. by frying, grilling, cooking, or other heating process, are also considered relevant.

OBJECT OF THE INVENTION

The present invention aims to provide measures that allow for improvements with regard to the products, either to be observed directly after moulding or after the final preparation, e.g. when tasting fully prepared hamburgers.

SUMMARY OF THE INVENTION

According to a first aspect thereof the invention provides a method for processing of a ground meat mass comprising:
depositing a ground meat mass in a hopper,
discharging said mass from said hopper to a positive displacement pump having an inlet and an outlet for the mass, the pump having one or more pump chambers that each are successively in communication with the pump inlet for the introduction of mass into the one or more pump chambers and with the pump outlet for the discharge of mass from the one or more pump chambers,
expelling the mass from the outlet of the pump into a tube structure that is connected to the outlet of the positive displacement pump, said tube structure having at least one mouth from which said mass is discharged, said mass being shielded by said tube structure from the surrounding atmosphere,
using a controllable vacuum assembly to subject the mass to a controlled evacuation of air at one or more locations in the trajectory of the mass starting from and including the hopper to and including a pump chamber at a position thereof where it is in communication with the pump inlet.

The method according to a first aspect is characterized in that at one or more locations in the tube structure between the pump outlet and the mouth, the mass is subjected to a controlled introduction of a gas into the mass by a controllable aeration assembly, the aeration assembly comprising a source of pressurized gas and an aeration member disposed in the tube structure between the pump outlet and the mouth, the aeration member being connected to the source of pressurized gas and having one or more orifices from which the gas is emitted, and the aeration assembly further comprises a gas pressure control device that is used to regulate the gas such that the gas is introduced into the mass at a controlled pressure that is at least equal to the actual pressure of the mass at the location of introduction of the gas into the mass.

The gas that is introduced into the mass is e.g. air, nitrogen, carbon dioxide, or another gas or gas mixture, e.g. air with a reduced oxygen content.

The ground meat mass may include beef, pork, poultry meat, or a vegetable protein as meat analogue, fish meat, as is known in the art.

As is common one or more foodstuff additives, e.g. powdered, solid, pasty or liquid additives, e.g. spices, fat, oil, vegetable additive, etc, may be present in the mass and/or fed into the mass during the processing according to the invention. E.g. one or more additives can be added downstream of the pump whilst the mass passes through the tube structure.

In an embodiment a mass pressure sensor is provided to determine the actual pressure of the mass at or near the location of the introduction of the gas, the mass pressure sensor being linked to the gas pressure control device.

This method allows for a controlled evacuation of the ground meat mass in the trajectory thereof leading into the pump chamber, and—once the mass has passed through the positive displacement pump—to aerate the mass, e.g. with air or another gas. The aeration gas is dispersed through the mass, the dispersion preferably being enhanced by the use of a multitude of orifices and/or by the use of some sort of agitation of the mass, and/or possibly resulting from the properties of the mass itself whereby the gas dispersed throughout the mass.

The evacuation has e.g. the advantage of allowing for uniformity of weight of the finally obtained products, e.g. moulded products or sausages, as the pump chamber is filled with mass containing little air so in fact a well defined portion (volume and weight) of mass. Operation of the pump, e.g. the pump speed, e.g. rotor speed in a vane pump, then allows to control the flow of mass towards the mouth, e.g. directly into mould cavities or into sausage casing.

By also allowing for controlled aeration after the mass has passed the pump, e.g. directly at the outlet thereof but preferably spaced from the pump outlet yet before reaching the mouth, the operator can introduce air or another gas into the mass transported towards the mouth. An advantage thereof is for example that the porosity of the finally obtained food product, e.g. a burger patty, can be increased by the aeration, the porosity e.g. positively affecting the density, texture and bite of the product as well as the juiciness. It has been found that a relatively small degree of aeration can have significant beneficial effects on the final product. E.g. a moulded meat product produced with maximum evacuation and no aeration may have a density of 1020 kg/m$^3$ whereas a product produced from the same starting mass with a slightly reduced evacuation and some aeration may have a density 980 kg/m$^3$. This difference is noticeable in tasting sample products.

In all the method according to a first aspect allows—as desired by the operator—to maintain, reduce, or increase the presence of air/gas within the finally obtained products compared to the starting mass.

The installation according to a first aspect also allows to replace air that is dispersed within the mass that is fed into the hopper, e.g. due to a prior processing step, e.g. the grinding of meat, by another gas that is then dispersed within the mass that is discharged from the mouth. This may e.g. serve to reduce the presence of oxygen in the mass, which may lead to an increased shelf life of the products and/or less strict packaging and/or storage requirements of the products.

The aeration may involve that solely a gas is introduced into the mass, but it is also envisaged that a mixture of a gas and a liquid, e.g. gas wetted with an edible oil or possibly a foamed liquid, can also be used for this aeration of the mass.

In general the aeration may be used to introduce along with the gas ingredients and additives (e.g. in powdered or particle form) that allow to influence, e.g. improve, one or more of the color, taste, scent, texture, shelf life, of the product. Agitation with for example a grinder allows to mix the mass with the introduced ingredients/additives in an efficient and quick manner.

The aeration member is preferably arranged in the tube structure such that all the mass that exits the pump is effectively passed along or through the aeration member. For example the aeration member is embodied with a housing that is releasably mountable in the tube structure at a location between the pump and the mouth, e.g. with connector flanges at opposite ends, the housing having one or more passages through which the mass flows during operation.

In an alternative the tube structure includes a splitter, wherein the flow of mass emerging from the pump is split into separate flow paths, possibly not all flow paths being provided with an aeration member so that not all subflows are aerated, or separate flow paths being subjected to different aeration treatments, e.g. with different gasses and/or conditions.

Possibly different subflows are recombined in a mass feed member equipped with one or more individual mouths from which each subflow is discharged, e.g. mouths in a concentric arrangement or a side-by-side arrangement.

A concentric arrangement can be used to obtain a discharge of the mass in a concentric layered condition, e.g. with a core and an outer layer. This may e.g. be used in combination with a sausage machine, wherein sausage casing is filled with said mass in concentric layered condition. This may e.g. be used to effect a difference in porosity between the core and the outer layer of the sausage.

A side-by-side arrangement of mouths may e.g. be used to created a striped mass being discharged from closely adjacent mouths, e.g. advantageous in combination with a moulding device which receives the striped mass, e.g. in a mould cavity thereof. Again this approach may be used to effect a difference in porosity between the stripes of the mass.

In a possible embodiment the aeration assembly comprises an agitator member in the path of the mass and adapted to agitate the mass in order to enhance the introduction and/or distribution of the gas into the mass. In a possible embodiment the aeration member is integrated with the agitator member.

In a possible embodiment the agitator member is movably arranged and a drive motor is provided for driving the agitator member. This may be combined if desired with one or more static parts. In another embodiment the agitator member is a static mixer member, having only static parts.

In a possible embodiment the agitator member is embodied as a grinder, e.g. a meat grinder, e.g. comprising a plate with a multitude of passages for the mass through the plate, and a cutter member, e.g. a rotary cutter member, passing along a face of the plate to obtain a grinding effect. Possibly the gas is introduced into the mass as the mass passes through the passages in the plate, the cutter member then also having the effect of further distributing the introduced gas through the mass.

It is also envisaged that in an embodiment the aeration member is located at or close to the mouth of the tube structure, so that the gas is introduced into the meat mass just before it emerges from the mouth. The aeration member may be embodied as a grinder in this example.

In a possible embodiment the aeration member comprises one or more porous members, e.g. of porous plastic or porous (sintered) metal, each porous member forming a multitude of fine orifices from which the gas is emitted into the mass. In an embodiment wherein a grinder is envisaged, one can envisage that the porous members are arranged on the plate, e.g. a bushes forming the passages in the plate, or that the plate section with passages is made of porous material, and/or that the cutter member is provided with porous members.

In an embodiment an electronic control system is used that is linked at least to the vacuum assembly and the aeration assembly, wherein the control system comprises a memory that stores—for multiple distinct masses and/or distinct products to be moulded from one or more masses—production settings of the evacuation by the vacuum assembly and of the aeration by the aeration assembly. This allows to store favoured production settings. e.g. based on testing (possibly including tasting) of prepared products.

In a preferred embodiment the positive displacement pump is a rotary vane pump with a pump housing having a pump cavity and with a rotor with multiple vanes in the cavity, the vanes delimiting multiple pump chambers. It will be appreciated that another positive displacement pump may be used as well, e.g. piston pump (either rotary or reciprocating) having one or more pistons (e.g. as in U.S. Pat. No. 7,309,228), a (double) screw pump, a rotary lobe pump, a gear pump.

Optionally use may be made of a feeder assembly associated with the hopper, e.g. with one or more augers, to assist in feeding the mass from the hopper to the positive displacement pump. For example one or more augers are arranged horizontally in a bottom section of the hopper, possibly an auger extending into an inlet duct leading towards the positive displacement pump.

In a possible embodiment the hopper is provided with an introduction opening for the mass that is associated with a lid or a valve, and the vacuum assembly is connected to the hopper thereby allowing the hopper to be evacuated.

In one embodiment the mass emerging from the mouth of the tube structure is fed to a devices that shapes the mass into products, e.g. a moulding device having one or more mould cavities in which the mass is received, a sausage machine wherein the mass is received in a sausage casing, or a portioner wherein the mass is divided into portions (e.g. to be deposited in trays).

In a preferred embodiment of a moulding device, a movable mould member is embodied as a mould drum having multiple mould cavities with a filling opening in its outer surface, the drum being rotated by a suitable drive in a rotation direction, either at constant speed or at variable speed, most preferably about a horizontal axis. The mould drum preferably comprises multiple cavities distributed over the length of the drum as well as in the circumferential direction of the drum, possibly in a helical arrangement.

As is preferred a mould cavity is embodied as a recess, having a bottom opposite the filling opening, e.g. the recess being formed in a monolithic section of porous material, e.g. porous sintered metal.

The mould may e.g. include pneumatic release of the moulded product from the mould cavity. e.g. air is blown through the porous material of the mould at a release position along the path of the mould member. In an alternative the moulding device includes a mechanical ejector for moulded products.

The mass feed member of the rotary drum moulding device may include a cone shaped body having a connector at one end for the tube structure and having a slotted elongated mouth at the other end, the mould cavities passing along the slot and being filled with a portion of the mass in the process.

As is preferred the mass feed member in a moulding device sealingly engages on the movable (e.g. reciprocating plate type or rotary drum type) mould member, so as to avoid the escape of mass between the mass feed member and the movable mould member.

It will be appreciated that the mould member can also be a plate. e.g. a reciprocating plate having multiple mould cavities that extend through the plate so as to have an opening in both the top face and the bottom face of the plate.

The moulding device may also be embodied as disclosed in US2004/0155129. In this embodiment the mouth of the tube structure is arranged to deposit the mass onto an endless belt that transports the mass along a cutting station where a cutter cuts the stream of mass into portions whilst lying on the belt. The portions then reach lateral shaping members that engage on each portion from opposite sides to shape the contour of the portions.

The present invention also relates to an installation for processing of a mass of pumpable foodstuff material, for example from a ground meat mass, the installation comprising:

- a hopper adapted to receive a batch of the mass of pumpable foodstuff material,
- a positive displacement pump having an inlet and an outlet for the mass, the pump forming one or more pump chambers that each are successively in communication with the pump inlet for the introduction of mass into the one or more pump chambers and with the pump outlet for the discharge of mass from the one or more pump chambers,
- a tube structure connected to the outlet of the positive displacement pump, said tube structure having at least one mouth from which said mass is discharged, said mass being shielded by said tube structure from the surrounding atmosphere,
- a controllable vacuum assembly adapted to cause controlled evacuation of air from the mass at one or more locations in the trajectory of the mass from and including the hopper to and including a pump chamber at a position where it is in communication with the pump inlet, which installation is characterised in that the installation comprises a controllable aeration assembly adapted to cause controlled introduction of a gas, e.g. air or another gas, into the mass at one or more locations in the tube structure between the pump outlet and the mouth, the aeration assembly comprising a source of pressurized gas and an aeration member disposed in the tube structure between the pump outlet and the mouth, the aeration member being connected to the source of pressurized gas and having one or more orifices from which the gas is emitted, and the aeration assembly comprising a gas pressure control device that allows to regulate the introduction of the gas into the mass at a controlled pressure that is at least equal to the actual pressure of the mass at the location of introduction of the gas into the mass.

The installation is suitable for processing of a ground meat mass as disclosed herein, but also for other pumpable foodstuff masses.

The installation may include one or more of the details as disclosed herein with respect to the processing of a ground meat mass, also when employed for other pumpable foodstuff masses, e.g. a potato mass.

The present invention also relates to a method for processing of a mass of pumpable foodstuff material, for example from ground meat, wherein use is made of an installation as discussed herein.

The present invention also relates to a method for determination of production settings for use in the above mentioned method for processing of a mass of pumpable foodstuff material, for example from ground meat, wherein use is made of an installation as discussed herein. This determination includes that multiple trial runs are performed with the installation, the trial runs having different settings of the evacuation by the vacuum assembly and of the aeration by the aeration assembly. The moulded products are then processed to be edible for human consumption, e.g. (oven) cooked and/or fried, and the edible products are then tested, e.g. by a test panel, e.g. testing the texture or bite of the product. The settings corresponding to the preferred trail run(s) are stored in the memory.

In a possible embodiment the weight and density are tested to obtain favoured production settings for the evacuation and aeration.

Possibly the production method involves the determination of the weight of a sample group of products that have been moulded by the moulding device as well as of the density of the products, the weight and density being compared to input values for weight and density and wherein the method involves increasing the vacuum if the weight is below the respective input value and wherein the method involves increasing the aeration of the density is above a respective input setting.

A second aspect of the present invention relates to a method, e.g. for processing ground meat mass, wherein an installation for processing of a mass of pumpable foodstuff material is used, said installation comprising:
- a hopper adapted to receive a batch of the mass of pumpable foodstuff material,
- a positive displacement pump having an inlet and an outlet for the mass, the pump forming one or more pump chambers that each are successively in communication with the pump inlet for the introduction of mass into the one or more pump chambers and with the pump outlet for the discharge of mass from the one or more pump chambers,
- a tube structure connected to the outlet of the positive displacement pump, said tube structure having at least one mouth from which said mass is discharged, said mass being shielded by said tube structure from the surrounding atmosphere,
- a controllable vacuum assembly adapted to cause controlled evacuation of air from the mass at one or more locations in the trajectory of the mass from and including the hopper to and including a pump chamber at a position where it is in communication with the pump inlet, so an installation as in the prior art without the aeration assembly as discussed herein being a required part thereof.

As mentioned above in practice the evacuation was done so as to get a complete evacuation, that is so as to remove as much air as possible from the mass, e.g. the meat mass, to be moulded.

The second aspect of the invention relates to a method, as described in claim 17, and envisages that the vacuum assembly is now used as a mechanism to control the weight and/or porosity of the shaped, e.g. moulded, products. This may be done by performing multiple trial runs with said installation, said trial runs having different settings of the evacuation by the vacuum assembly. The products are then processed to be edible for human consumption, e.g. (oven) cooked and/or fried, and said edible products are then tested, e.g. by a test panel, e.g. testing the texture or bite of the product. The settings of the vacuum assembly corresponding to the preferred trail run(s) are then e.g. stored in a memory of the installation.

The second aspect of the invention provides a method for shaping, e.g. moulding, of three dimensional products from a mass of pumpable foodstuff material, for example from ground meat, wherein use is made of an installation comprising:
- a hopper adapted to receive a batch of the mass of pumpable foodstuff material,
- a positive displacement pump having an inlet and an outlet for the mass, the pump forming one or more pump chambers that each are successively in communication with the pump inlet for the introduction of mass into the one or more pump chambers and with the pump outlet for the discharge of mass from the one or more pump chambers,
- a tube structure that is connected to the outlet of the positive displacement pump, said tube structure having at least one mouth from which said mass is discharged, said mass being shielded by said tube structure from the surrounding atmosphere,
- a shaping device receiving the mass from the at least one mouth of the tube structure, which shaping device shapes the mass into three dimensional products.

For example the shaping device is embodied as a moulding device, said moulding device preferably comprising:
- a frame,
- a mould member having multiple mould cavities, each having a filling opening for the introduction of foodstuff material into the mould cavity,
- wherein the mould member is movably supported by the frame,
- a mould member drive for moving the mould member along a path, said path including a fill position for filling the mass into a mould cavity and a product release position for releasing a moulded product from the mould cavity,
- a mass feed member, preferably supported by the frame, having said mouth at the fill position along the path of the mould member, said mass feed member being connected to the fill tube and being adapted to transfer the mass into a mould cavity of the mould member when the filling opening thereof is in communication with the mouth at said fill position.

The installation according to the second aspect of the invention further comprises a controllable vacuum assembly adapted to cause controlled evacuation of air from the mass at one or more locations in the trajectory of the mass from the hopper to and including the pump chamber at a position where it is in communication with the pump inlet.

The installation according to the second aspect of the invention is characterized in that the level of evacuation provided by the vacuum assembly is used as a control mechanism to control the weight and/or porosity of the shaped, e.g. moulded, products.

For example products, e.g. ground meat products, are formed using the moulding device other shaping device. Then one or more products are taken from the shaping device, e.g. from a conveyor downstream of the moulding device, without any further treatment of the meat products that would affect their density. Then the density of the products is determined in a manual or automated process, e.g. by weighing the product both when submerged in water and in dry condition. Or by visual or optical determination of the volume of the product, e.g. using a laser triangulation system that allows to determine the three-dimensional shape of the product and thereby the volume, combined with a weighing of the product. Laser based volume measurement systems are already proposed for e.g. slicing installation of food products to obtain slices of constant weight.

Whereas the above approaches can be seen to represent an "offline and batch sampling approach" to determine density of products, one can also envisage an "in-line determination" of density, wherein in a continuous or semi-continuous manner the density of the mass is determined when the mass passes through the tube structure, e.g. in between the pump outlet and the mouth. For example between the pump outlet and the inlet of the mass feed member of a moulding device when present. So then the density is determined of the mass before the mass exits the mouth, and before any products are moulded if a moulding device is provided.

The in-line determination of the mass density may e.g. be done on the basis of a radiation measurement of the density, e.g. using an X-ray device, wherein radiation is transmitted through the mass and based thereon the density of the mass is calculated. It is noted that radiation measurement devices, e.g. X-ray devices, are already employed to detect foreign or undesired objects in food, e.g. in meat masses, e.g. to find bone fragments, metal or glass particles, etc. It is known to incorporate such radiation based detection devices in the tube structure downstream of a meat pump to determine the presence of foreign, undesired objects in the pumped mass. However in known approaches using such detection devices one strives for creating a "complete evacuation" of the meat mass to eliminate air pockets in the mass and to thereby to create a better image from the detector in view of the desired detection of bone fragments or other objects. The second aspect of the invention does not strive for the most complete evacuation of the meat mass by the vacuum assembly and instead proposes to use the density measurement to control the operation of the vacuum assembly in order to achieve a desired density of the product which does not correspond to the density of a completely evacuated mass. It will however be appreciated that the provision of a radiation measurement device that analyses the pumped mass passing through the tube structure in view of the determination of the density of the mass and relating control of the vacuum assembly and/or the pump may be employed for not only the determination of density of the mass, but also for detection of undesired objects in the mass at the same time.

Another possible inline determination of the density of the pumped mass can be based on an air bubbles detector device that is adapted to detect small air bubbles in the pumped mass. Such detectors are known in process control installations to monitor a fluid stream with air bubbles. The same principle is now proposed to be applied for the pumped mass, e.g. for ground meat, in the installations mentioned herein.

In a possible embodiment of an air bubbles detector a sensor is employed wherein light is guided by an optical fibre having an end that is arranged within the tube structure so as to be in direct contact with the pumped mass. The measurement principle is based on the effect that when an air bubble (which may be very small) is in direct contact with the end of the optical fibre the reflection of light back into the fibre is different from the situation wherein a solid or liquid portion of the mass is in contact with said optical fibre end. Based on the determination of air bubbles in the mass one can obtain a signal that is representative for the mass density of the mass passing through the tube structure.

Another embodiment of an air bubbles detector use is made of one or more ultrasonic transducers, which generate and receive ultrasonic waves and based thereon allow to determine the presence of air bubbles in the mass and thus allow to provide a signal that is representative of the density of the mass passing through the tube structure.

Another possible inline determination of the density of the pumped mass is the use of a Coriolis mass flowmeter. Such a meter allows the determine the product density even when air is entrapped in the mass, e.g. calculated from the resonant frequency of a vibration sensing tube of the flowmeter.

In another in-line determination of the mass density, one can envisage that a portion of the pumped mass is passed to a dedicated bypass channel of the tube structure, e.g. a minor portion of the total pumped mass, e.g. less than 50%, and the density of the mass passing through said bypass channel is determined. For example the bypass channel passes a radiation based density measurement device or other automated density measuring device. Then the bypassed mass is combined again with the rest of the mass, downstream of the measurement position.

In another in-line determination of mass density one can envisage that the tube structure is provided with a valved sampling device or a valved branch duct, allowing to take a sample portion from the mass passing between the pump and the mouth, e.g. automated at preset time intervals. The sample portions so obtained are directly analysed to determine their density and the result used to control the operation of the vacuum assembly and/or the pump. Analysis of the sample so obtained may e.g. involve taking a sample of a predetermined volume by allowing the mass to flow via the opened valve into a sample chamber of a known initial sample volume. The sample is still subjected to the pressure in the tube structure as it enters and fills the sample chamber. Then the valve is closed, so that the sample chamber and sample therein are no longer in communication with the tube structure. Then the sample is allowed to expand as the volume of the chamber is expanded and is connected to the atmosphere. The degree of expansion of the sample compared to the initial sample volume is representative for the presence of air in the mass and thus for the density of the mass as the air will expand due to the reduced pressure acting on the sample. For example the sample chamber has a piston that is allowed to move once the sample chamber is filled and disconnected from the tube structure, the mass acting on one side of the piston and the other side then being exposed to atmospheric pressure. The ultimate piston position then is representative of the expansion and thereby the initial density. After the measurement the chamber is emptied and readied for taking a new sample.

The in-line determination of the mass density by a mass density measurement device, e.g. based on X-ray. Coriolis effect, air bubbles, etc., is preferably used as a feedback signal for operation of the vacuum assembly and/or of the pump. For example a control unit can be employed wherein a desired value is input for the mass density when passing through the tube structure. e.g. based on an order to (ground meat) products with a certain specification, and the inline measurement device determines continuously or at intervals the density of the passing mass and compares the determined density with the desired density and provides a suitable feedback signal. It will be appreciated that the same feedback can be employed when the density is determined in an offline situation as described above.

In an embodiment the method according to the first and/or second aspect of the invention comprises the steps of:
forming one or more products using a moulding device,
taking, e.g. manually or by a robot, said one or more moulded from the moulding device or a conveyor downstream thereof without any further treatment of the meat products that affects their density, and
determination of the density of the moulded products,
using the results of the density determination to control the level of evacuation by the vacuum assembly during operation of the installation.

In an embodiment the method according to the first and/or second aspect of the invention comprises the step of in-line determination of the density of the mass, in a continuous or semi-continuous manner, as it passes through the tube structure, e.g. in between the pump outlet and the mouth, and using the in-line determination of the mass density as a feedback signal for control of the operation of the vacuum assembly. In a further development thereof the in-line determination of the mass density is done on the basis of a radiation measurement of the density, e.g. using an X-ray device or other radiation measurement device, wherein radiation is transmitted through the mass and based thereon the density of the mass is calculated. For example, the radiation measurement is also used to detect foreign objects in the mass as it passes through the tube structure.

In an embodiment the method according to the second aspect of the invention a portion of the mass is passed to a bypass channel of the tube structure, e.g. a minor portion of the total mass, e.g. less than 50%, and the density of the mass passing through said bypass channel is determined, the bypassed mass being combined again with the rest of the mass downstream of the measurement position.

In an embodiment the method according to the second aspect of the invention for the in-line determination of mass density the tube structure is provided with a valved sampling device, and a sample portion is taken from the mass passing between the pump and the mouth, e.g. automated at preset time intervals, by opening the valve so that the mass enters the sampling device.

For example the sampling device comprises a sample chamber of a predetermined initial sample volume, and wherein the sample is taken by allowing the mass to flow via the opened valve into the sample chamber—the sample still being subjected to pressure in the tube structure as it enters and fills the sample chamber, wherein the valve is then closed, so that the sample chamber and sample therein are no longer in communication with the tube structure, and wherein then the sample is allowed to expand as the volume of the chamber is expanded or allowed to expand and is connected to the atmosphere, such that the degree of expansion of the sample compared to the initial sample volume is representative for the presence of air in the mass and thereby for the density of the mass.

The second aspect of the invention also relates to an installation for shaping, e.g. moulding, of three dimensional products from a mass of pumpable foodstuff material, for example from ground meat, wherein the installation comprises:
a hopper adapted to receive a batch of the mass of pumpable foodstuff material,
a positive displacement pump having an inlet and an outlet for the mass, the pump forming one or more pump chambers that each are successively in communication with the pump inlet for the introduction of mass into the one or more pump chambers and with the pump outlet for the discharge of mass from the one or more pump chambers,
a tube structure that is connected to the outlet of the positive displacement pump, said tube structure having at least one mouth from which said mass is discharged, said mass being shielded by said tube structure from the surrounding atmosphere,
a shaping device receiving mass of the at least one mouth from the tube structure, which shaping device shapes the mass into three dimensional products.

For example the shaping device is a moulding device receiving the mass from the at least one mouth of the tube structure, said moulding device preferably comprising:
a frame,
a mould member having multiple mould cavities, each having a filling opening for the introduction of foodstuff material into the mould cavity, wherein the mould member is movably supported by the frame,
a mould member drive for moving the mould member along a path, said path including a fill position for filling the mass into a mould cavity and a product release position for releasing a moulded product from the mould cavity,
a mass feed member, preferably supported by the frame, having said mouth at the fill position along the path of the mould member, said mass feed member being connected to the fill tube and being adapted to transfer the mass into a mould cavity of the mould member when the filling opening thereof is in communication with the mouth at said fill position.

The installation according to the second aspect of the invention comprises a controllable vacuum assembly adapted to cause controlled evacuation of air from the mass at one or more locations in the trajectory of the mass from the hopper to and including the pump chamber at a position where it is in communication with the pump inlet.

The installation according to the second aspect of the invention is characterized in that the installation comprises a mass density measurement device adapted to determine the density of the mass as it passes through the tube structure, preferably said device being connected to the vacuum assembly and providing a feedback signal for control of the operation of the vacuum assembly.

In an embodiment of the installation the mass density measurement device comprises a radiation measurement of the density of mass passing through the tube structure, e.g. an X-ray device or other radiation measurement device, wherein radiation is transmitted through the mass and based thereon the density of the mass is calculated.

In an embodiment the radiation based mass density measurement device is also adapted to perform a detection of foreign objects in the mass as it passes through the tube structure.

In an embodiment the mass density measurement device comprises a valved sampling device that is connected to the tube structure, and wherein the device is adapted to allow for a sample portion to be taken from the mass passing between the pump and the mouth, e.g. automated at preset time intervals, by opening the valve so that the mass enters the sampling device.

It will be appreciated that the approaches according to the second aspect of the invention, and any of the devices discussed in combination therewith, can be readily combined with the method and installation according to the first aspect of the invention, e.g. to allow for determination of the mass density of the moulded products or of the mass downstream of the aeration member in order to control the aeration of the mass.

The radiation measurement device may in addition to the mentioned tasks of density determination and/or foreign object detection, also be configured to determine properties of the passing mass, e.g. of a meat mass, e.g. properties relating to the composition, such as for example one or more of the fat content, protein content, water content, etc. One can also envisage embodiments wherein a radiation measurement device, e.g. arranged in an inline configuration, is solely dedicated to determination of one or more such properties.

The density measurement device may also be used to control the operation of the pump in the mentioned installation, possibly as alternative to control of the vacuum assembly or control both the pump (e.g. speed) and the vacuum assembly.

Detection of bone fragments by means of a radiation measurement device may be used in view of food quality and food safety, e.g. in view of tracking and tracing of food products.

For example the method according to the first aspect of the invention may—in an embodiment—comprise the step of determination of the density of the mass passing through the tube structure in the trajectory between the aeration member and the mouth, e.g. by a radiation based density measurement device, e.g. based on X-ray, or by a Coriolis measurement device. In an embodiment the result from said determination is used as a feedback signal to control the operation of the aeration assembly, e.g. directly linked electronically thereto or by means of a display for an operator who may seek to change one or more operating setting of the aeration assembly accordingly. The first aspect of the invention also relates to an installation having—in an embodiment—such a density measurement device.

One can even envisage the application of two radiation measurement devices in the method and installation of the first aspect of the invention:
 one radiation measurement device between the pump and the aeration member, said device being configured and operated to detect foreign objects, e.g. bone fragments, in the evacuated mass,
 one radiation measurement device downstream of the aeration member, said device being configured and operated to determine the density of the mass passing through the tube structure.

In yet another embodiment of the first aspect of the invention, only a radiation measurement device is placed between the pump and the aeration member. The device may be configured and operated solely to detect foreign objects, e.g. bone fragments, in the pumped mass, but may also be configured and operated to determine mass density, e.g. to control the vacuum assembly, or the device may be configured and operated to perform both tasks.

The present invention also relates to a food product, e.g. a meat product, e.g. a meat patty, sausage, obtained with the method and/or installation according to the invention.

The aspects of the present invention will now be explained with reference to the drawings.

DETAILED DESCRIPTION OF EMBODIMENTS

Figure 1:
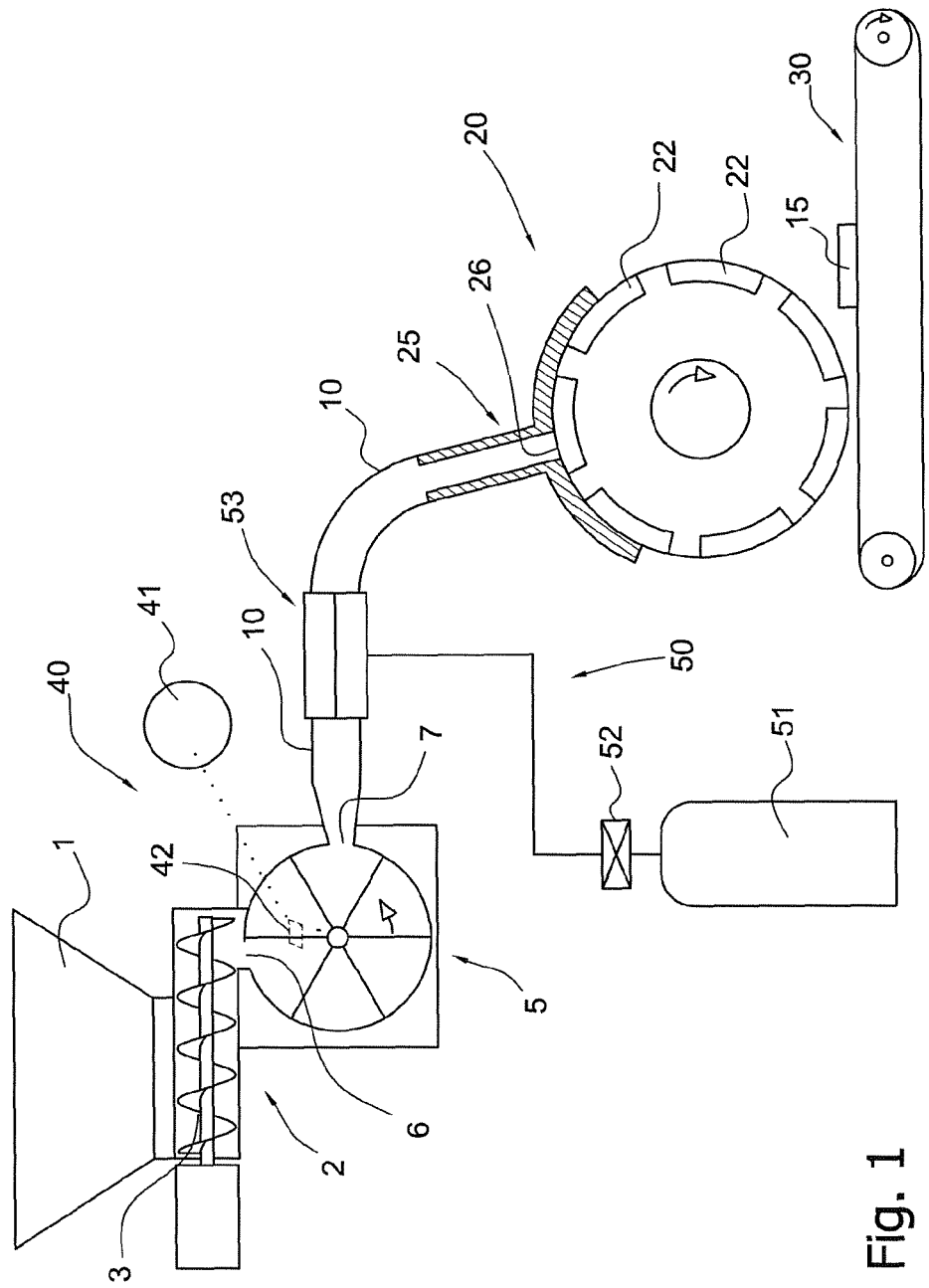
FIG. 1 depicts schematically an installation according to the invention having both a vacuum assembly and an aeration assembly,
FIG. 2 schematically depicts a portion of an example of an aeration member of an installation according to the invention,
FIG. 3 schematically depicts a portion of another example of an aeration member of an installation according to the invention.

FIG. 1 schematically depicts an installation for the moulding of three dimensional products from a mass of pumpable foodstuff material, for example from a ground meat mass.

A batch of ground meat mass, e.g. of beef, pork, or poultry meat, is commonly prepared with a meat grinding device or a mixer/grinding device. A batch is e.g. loaded into a (wheeled) bin and then transported to the installation. Instead of loading the hopper with bins, the loading may be conducted via a pipe connecting to the hopper.

The installation comprises a hopper 1 that is adapted to receive a batch of the mass of pumpable foodstuff material. The hopper 1 may have a funnel shape but different shaped hoppers are also possible as long as they are able to receive one or more batches of the mass, possibly via a feed conduit directly leading to the hopper.

In this example a feeder assembly 2 is associated with the hopper 1 to assist in discharging the mass from the hopper 1. In this example one or more motor driven augers 3 are mounted at the bottom of the hopper 1.

The installation furthermore comprises a positive displacement pump 5 having an inlet 6 receiving the mass from the hopper 1, here via the auger 3.

The pump further has an outlet 7 for the mass. The pump shown is a vane pump with a rotor having multiples vanes disposed in a pump cavity of the pump housing. Such pumps, e.g. supplied by Risco (Italy) are known for pumping ground meat and other pumpable foodstuff masses. A drive motor (e.g. electric, not shown) is provided for driving the rotor. The pump forms pump chambers, in the figure shown between neighbouring vanes, that each are successively in communication with the pump inlet 6 for the introduction of mass into the pump chamber and with the pump outlet 7 for the discharge of mass from the pump chamber. The effective volume of the pump chamber reduces from the position thereof at the pump inlet to the position thereof at the pump outlet, so that the mass is effectively expelled from the pump chamber when the pump is in operation. An example of such a pump is disclosed in U.S. Pat. No. 4,761,121.

The optional feeder assembly 2 is arranged to aid in transporting the mass from the hopper 1 towards the inlet 6 of positive displacement pump 5.

The pump may instead of a vane pump also be embodied as a different type of pump, e.g. as a piston pump having one or more reciprocating pistons.

A fill tube 10 of a tube structure is connected to the outlet 7 of the pump 5. This tube 10 in this example leads the mass to a moulding device 20.

The moulding device comprises a frame (not depicted here) and a mould member 21 that is movably supported, here a rotating mould drum—as is preferred rotating about a horizontal axis, by the frame.

The mould member 21 has multiple mould cavities 22, each having a filling opening for the introduction of foodstuff material into the mould cavity 22. As is preferred in a mould drum embodiment, the cavities are embodied as recesses in the outer surface of the drum body, having a bottom opposite the filling opening of the cavity.

A mould member drive (not shown) is provided for moving the mould member along a path, here a circular path about the rotation axis of the drum mould 21. This path in general includes a fill position for filling the mass into a mould cavity 22 and a product release position for releasing a moulded product from the mould cavity.

A mass feed member 25 is arranged at a fill position, preferably a stationary fill position, preferably supported by the frame of the moulding device. The mass feed member 25 has at least one mouth 26 from which the mass dispensed. The mouth is positioned along the path of the mould member. The mass feed member 25 is connected to the fill tube 10 and forms part of a tube structure.

The mass feed member 25 is adapted to transfer the mass into a mould cavity of the mould member when the filling opening thereof is in communication with the mouth at the fill position. For example the member 25 may have an elongated slot shaped mouth extending generally at right angles to the path of the mould member, e.g. a single slot extending in a longitudinal direction of the rotating drum mould, so that all mould cavities therein come into communication with said mouth when they pass the fill position during rotation of the mould member. As is preferred the mass feed member sealingly engages the surface of the movable mould member 21 in which the cavities are formed, so that substantially no mass may escape between the mass feed member and the mould member.

Preferred details of a mould drum and an associated mass feed member are e.g. disclosed in WO00/30548 and in WO2004/002229.

The pump 5 provides the pressure that urges the mass from the pump towards the mass feed member and out of the mouth of the mass feed member. By suitable control of the pump 5, e.g. of the pump rotor speed, e.g. using a controllable electric drive motor M (see FIG. 5), the flow of mass to the mouth 26 can be controlled.

At a release position the formed product, here meat product 15, is released from the mould cavity, e.g. to be transported onward on a conveyor 30. The release from the mould cavity may be assisted by pneumatic pressure, e.g. as the wall of the mould cavity comprises one or more sections of porous material through which pressurized air or gas is forced thereby assisting the release of the product. A mechanical ejector member may also be provided to perform or assist in the release of the product from the mould member.

It is noted that in an alternative embodiment (not shown) the mould member may be plate shaped instead of drum, e.g. in a turret device where the plate revolves about a vertical axis, or e.g. in a reciprocating plate moulding device. In the latter known type of device, a mould plate with multiple moulding cavities that are open both on the top side and the bottom side of the plate member is reciprocated, so that the mould cavities are at a fill position to receive mass from a mass feed member and are later at a release position (commonly provided with a plunger ejector member to punch the formed products out of the cavities).

The installation comprises a controllable vacuum assembly 40, here integrated with the pump 5 as is known in the art, e.g. known for pumps used in stuffing sausage casings. This assembly 40 is adapted to cause controlled evacuation of air from the mass at one or more locations in the trajectory of the mass from the hopper 1 to and including the pump chamber at a position where it is in communication with the pump inlet 6 of the positive displacement pump. As is preferred, this vacuum assembly comprises a vacuum pump 41, e.g. an electrically operated vacuum pump.

As is preferred, a vacuum port 42 is arranged in the pump 5 so as to be effective in establishing a vacuum in the pump chamber that is in communication with the inlet 6 during operation of the pump 5. This vacuum assists in the complete filling of the chamber with a portion of the mass.

As explained above, a vacuum may be created in the hopper 1 as is known in the art. A vacuum may also be created in any passage between the hopper 1 and the pump inlet 6, e.g. in a duct into which one or more augers of a feed assembly extend.

As explained the vacuum assembly 40 allows the evacuation of the mass, e.g. the ground meat mass, so as to reduce the presence of air in the mass. This increases the uniformity of the products when it comes to the weight of mass that is effectively introduced into each of the mould cavities 22, among other advantages.

The installation also comprises a controllable aeration assembly that is adapted to cause controlled introduction of a gas, e.g. air or another gas or gas mixture, e.g. $N_2$ or $CO_2$, into the mass at one or more locations in the trajectory of the mass between the pump outlet 7 and the mouth of the mass feed member 25.

In this example wherein a shaping device having one or more mould cavities is connected to the mouth 26, the gas is thus introduced into the mass, before the mass enters the mould cavity in which the product is formed. It is observed that in this trajectory the mass passes through the tube 10, the mass feed member 25 and is in generally within a passage that is closed from the surrounding atmosphere.

The aeration assembly comprises a source of pressurized gas 51, here depicted as a gas bottle, but other embodiments are also possible, e.g. with an air compressor that handles filtered air.

The aeration assembly further comprises a gas pressure control device 52, that allows the introduction of the gas into the mass at a controlled gas pressure that is at least equal to the actual pressure of the mass at the location of introduction of the gas into the mass in order to obtain a reception of the gas in the mass. The gas pressure need not be significantly above the pressure in the mass to obtain an effective introduction of gas into the mass.

Preferably one or more mass pressure sensors are present in this gas introduction trajectory to determine the actual pressure of the mass, the mass pressure sensor being operatingly connected to the gas pressure control device 52, e.g. to obtain a variation in the gas pressure based on the sensed pressure of the mass which may vary over time (e.g. due to the mould cavities coming into and out of communication with the mouth of the mass feed member).

The aeration assembly comprises an aeration member 53 disposed in the path of the mass between the pump outlet 6 and the mouth of the mass feed member 25. This aeration member 53 is connected to the source 51 of pressurized gas and has one or more orifices from which the gas is emitted into the mass.

As explained above the aeration assembly allows the introduction of gas, e.g. air or another gas, or of a mixture of gasses, possibly a mixture of a gas and a liquid, e.g. with an edible oil or a liquid (anti-)foaming agent, into the mass downstream of the pump before the mass is introduced into the mould cavity. This e.g. allows control of the porosity of the moulded products, thereby e.g. influencing parameters like texture, bite and juiciness of the finally prepared food product, e.g. hamburger, and/or the further preparation process, e.g. the cooking or frying.

As explained the installation allows for example to first evacuate the mass as much as possible in the trajectory between the hopper and the pump 5, thereby enhancing the uniformity of the mass entering the pump chamber and thereby enhancing the weight uniformity of the moulded products. The installation also allows the (re-) introduction of air or another gas into the mass, effectively downstream of the pump, thereby allowing for e.g. increased porosity of the mass before it enters the mould cavity.

As is preferred, the installation comprises an electronic control system operatingly connected to at least to the vacuum assembly 40 and to the aeration assembly 50. This control system preferably comprises a memory adapted to store production settings of the evacuation by the vacuum assembly and of the aeration by the aeration assembly, e.g. for multiple distinct masses and/or distinct products to be moulded from one or more masses.

In order to determine production settings for use in the method for moulding the products with the installation it is envisaged that multiple trial runs may be performed with the installation, the trial runs having—using the same mass and the same mould member—different settings of the evacuation by the vacuum assembly and of the aeration by the aeration assembly. The formed products can be tested immediately after being so formed, e.g. tested for one or more of the parameters porosity, density, and weight.

It is also envisaged that the formed products are processed further in order to be edible for human consumption, e.g. (oven) cooked and/or fried, e.g. as with a meat product. Then the edible products are tested, e.g. by a test panel. e.g. testing one or more of the parameters texture, bite, juiciness, weight, shape, of the product. Based on the favoured product the setting corresponding to the relevant trial run are then used as production parameters, e.g. stored in a memory of the installation when present.

As explained above the installation can also be employed to remove air from the mass that is introduced into the installation, and to replace the air by another gas or gas mixture, e.g. a gas that promotes the shelf life of the product, e.g. a non-oxygen gas, e.g. carbon dioxide gas or nitrogen.

In a simple embodiment the aeration member 53 comprises a double walled section, with the outer wall being closed and the inner wall having a multitude of orifices. e.g. machined therein or the inner wall being made of porous material. Air or another gas is then supplied in the space between the outer and inner wall, so that the air then is introduced into the mass that passes through the passageway formed by the inner wall.

The aeration member may define a circular cross-section passageway of the mass, but also other cross-sectional shapes, e.g. a rectangular passageway through which a relatively thin layer of mass is transported with opposed main faces into which the air or gas is introduced.

Figure 2:
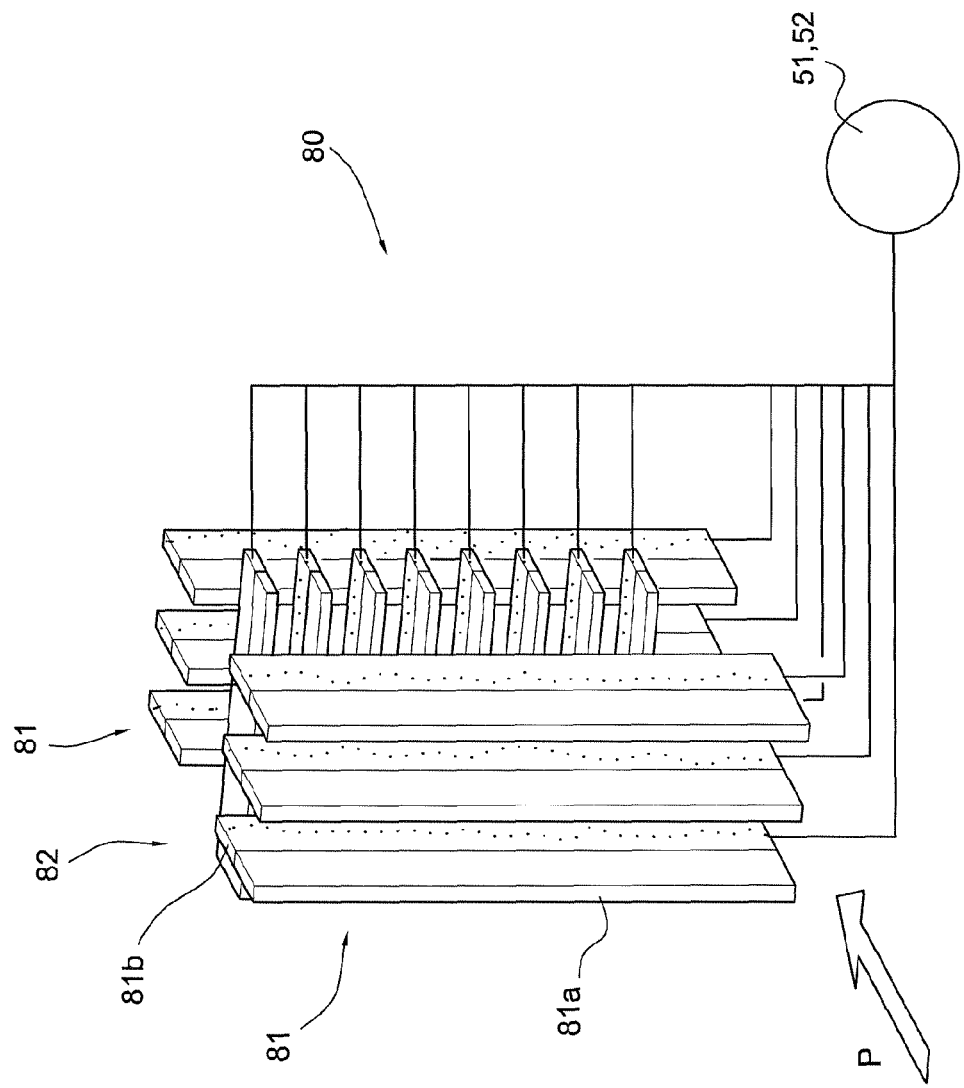

An embodiment of an aeration member 80 is partly shown in FIG. 2. Here a part is shown that is to be arranged in a passageway of the aeration member through which the mass passes. The member 80 includes one or more orificed gas emitting elements 81, 82 to be arranged in the passageway, here—as example—one or more groups of parallel elongated rod members emitting the gas into the mass. The aeration elements 81, 82 are connected to the source 51 and pressure control assembly 52

In the example shown here a first group of elements 81 is arranged in one direction, whereas another group of elements 82 is arranged in another direction, thereby causing the mass to effectively pass through a grid of gas emitting member 81, 82.

In this example it is illustrated to one or more elements 81, 82 are fully or partially made from porous material, e.g. sintered porous metal, each forming a multitude of fine orifices from which the gas is emitted into the mass.

In this example each element 81, 82 has a leading end 81a, facing the stream of mass indicated with arrow P, that is non-porous, and a trailing end 81b provided with the one or more orifices, e.g. from porous material.

Preferably the effective cross-section for the mass to pass through at the aeration member is at least equal to the cross-section of the pump outlet.

Aeration member elements 81, 82 may be arranged to form a static mixer, so with only static components causing the split up of the stream of mass into substreams that are then reoriented and/or mixed with one another as the mass passes through the static mixer.

The aeration assembly may comprise a movable agitator member in the path of the mass in the tube structure and adapted to agitate the mass in order to enhance the introduction and distribution of the gas into the mass. Such an agitator member could e.g. be arranged downstream of the member depicted in FIG. 2, e.g. with one or more rotating blades. e.g. similar to a boat propeller or a fan, that agitate the mass by operation of a drive motor for driving said agitator member so as to entrain the mass in said motion of the agitator member.

In an example the one or more of the groups of elements 81, 82 may be arranged to rotate about a central axis of the aeration member during operation. This would then be an example of an aeration member that is integrated with the agitator member.

Figure 3:
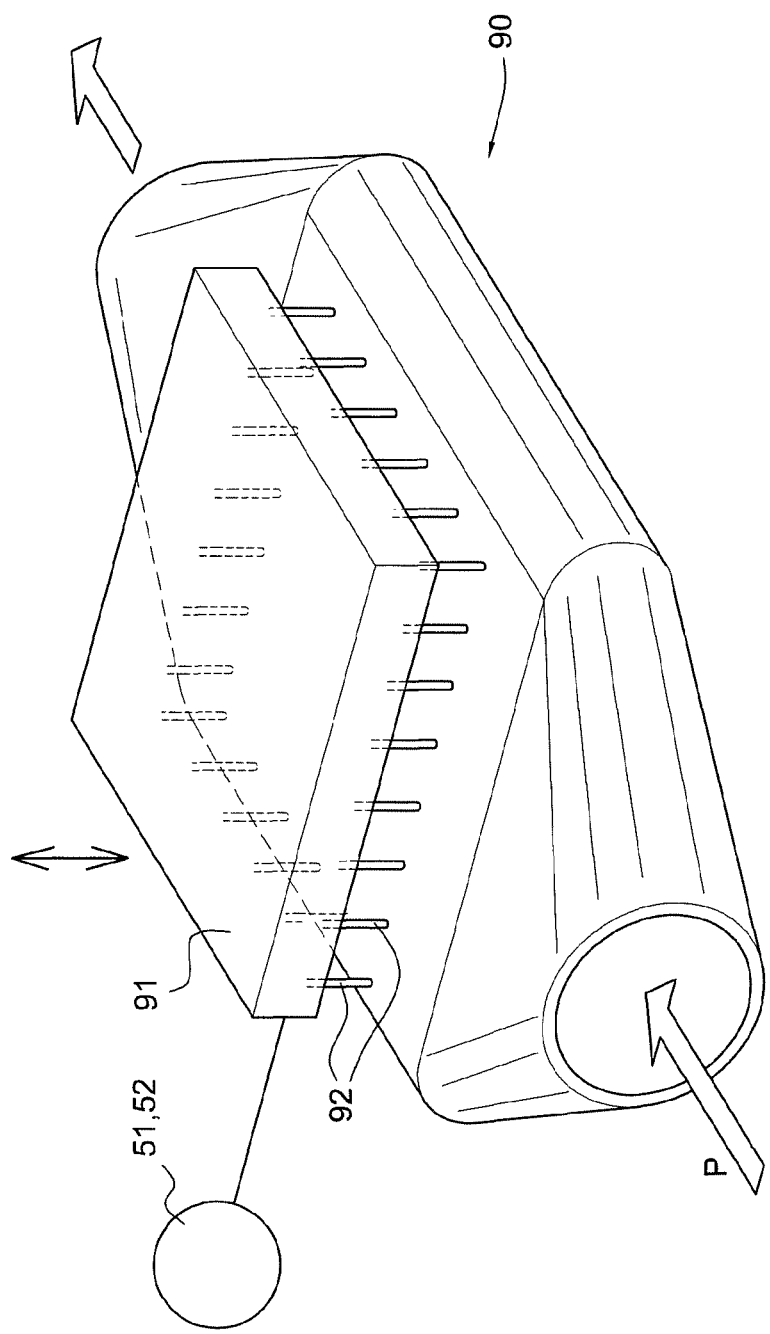

In FIG. 3 an example of an aeration member 90 is depicted, wherein the housing of the member forms a duct wherein the mass, entering the member through a circular opening, is brought into a shape of a flattened layer, the air or gas being introduced into the mass from one or more main faces of the flattened layer.

In this example the aeration member 90 includes a needle member 91 having a multitude of parallel needles 92 that each extend into the passageway for the mass. The needles are hollow or porous so that air or gas can be fed via the needles into the mass.

The needle member 91 in this example, as is optional, is movable by a drive (not shown) allowing to move the needles to different positions within the duct, e.g. reciprocating along their axis within the duct during the passage of the mass. This allows e.g. for an enhanced distribution of air or gas in the mass.

The aeration member, in particular of any agitator member thereof when present, e.g. the needle member 91, may be employed to alter the orientation of any fibres in the mass (e.g. as is present in ground meat) when present, e.g. to alter the orientation of such fibres compared to the orientation when the mass emerges from the pump outlet.

The second aspect of the invention relates to a method for use of an installation as illustrated in FIG. 1 without the presence of an aeration assembly, so in fact a prior art installation. In this method the level of evacuation provided by the vacuum assembly is used as a control mechanism to control the weight and/or porosity of the moulded products. The evacuation is not performed to obtain a maximized evacuation of the mass, but the evacuation is done in a manner to achieve the moulding of a product with a desired weight and/or porosity. Again, it is possible to perform trial runs with the installation to determine the optimal production setting for a particular combination of mass to be handled and mould member used, and store the production setting in a suitable memory of an electronic control unit of the installation when present. The degree of evacuation can then be well below the maximum level of evacuation for the respective mass. e.g. between 40 and 80 percent of the maximum evacuation level (to be determined with the installation when filled with the mass).

It is noted that it is known from e.g. WO00/30548 to have multiple mass feed members positioned at different positions along the path of the mould member, the mould member being embodied such that a multilayer product can be obtained, e.g. having a movable bottom to allow for different volumes of the mould cavity; first to be filed with the first mass, then lowering of the bottom to make space for the second mass.

In this respect it is envisaged that an installation e.g. having two mass feed members may have just one aeration member to aerate the mass flowing to one of the mass feed members and not the mass to one or more other mass feed members, or the installation has multiple, independently controllable aeration members. This e.g. allows to feed masses to these mass feed members that have undergone different aeration processes, e.g. one mass being non-aerated, the other mass being aerated, or masses being aerated differently. The mass can emerge from a common positive displacement pump, e.g. with a splitting manifold behind the pump. The mass can also emerge from different pumps, each having its corresponding hopper and connected to a respective mass feed member. e.g. as the masses are of entirely different composition.

Figure 4:
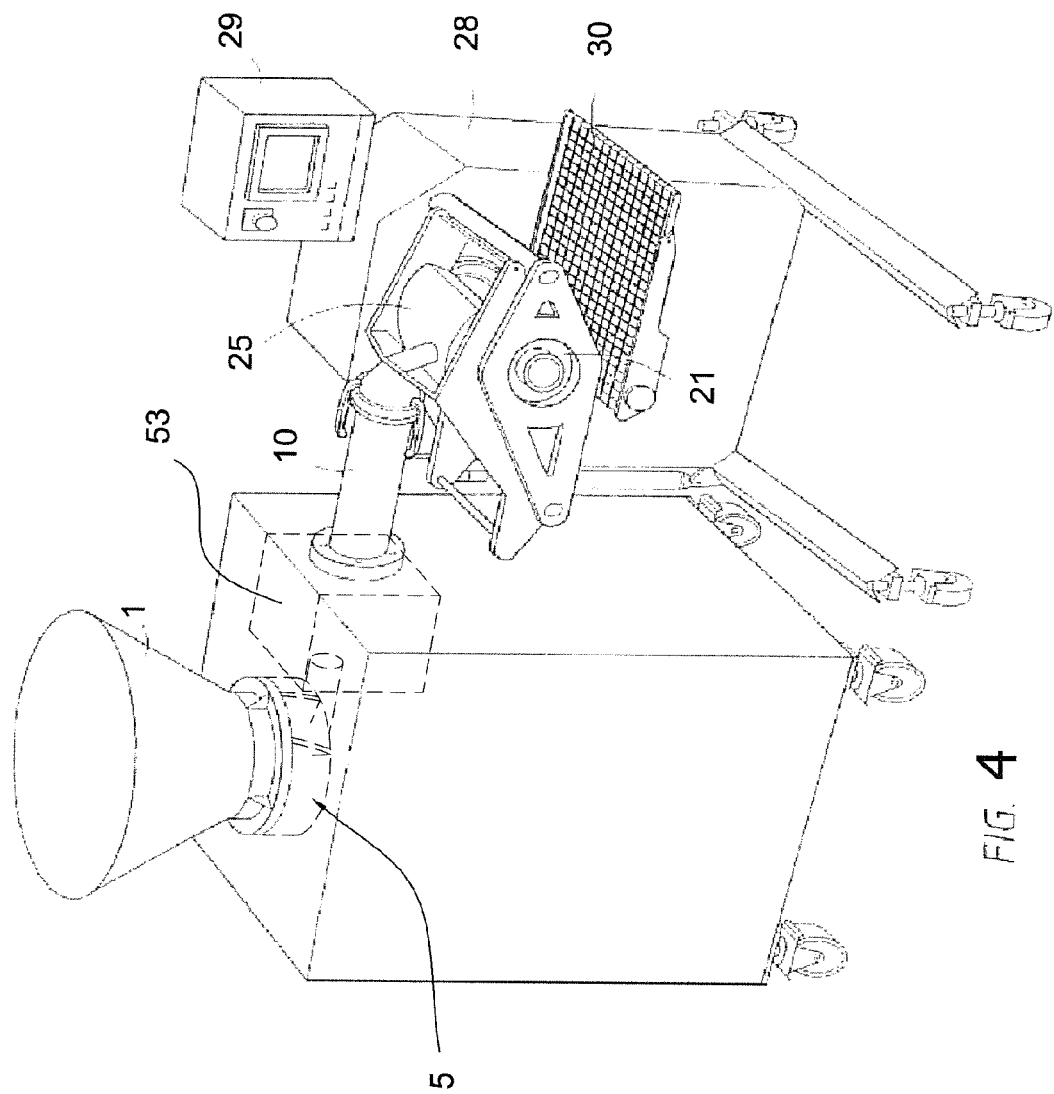
FIGS. 4 and 5 depict an example of an installation having the layout schematically depicted in FIG. 1,
FIG. 6 schematically depicts another installation according to the invention including a density measurement device.
Figure 5:
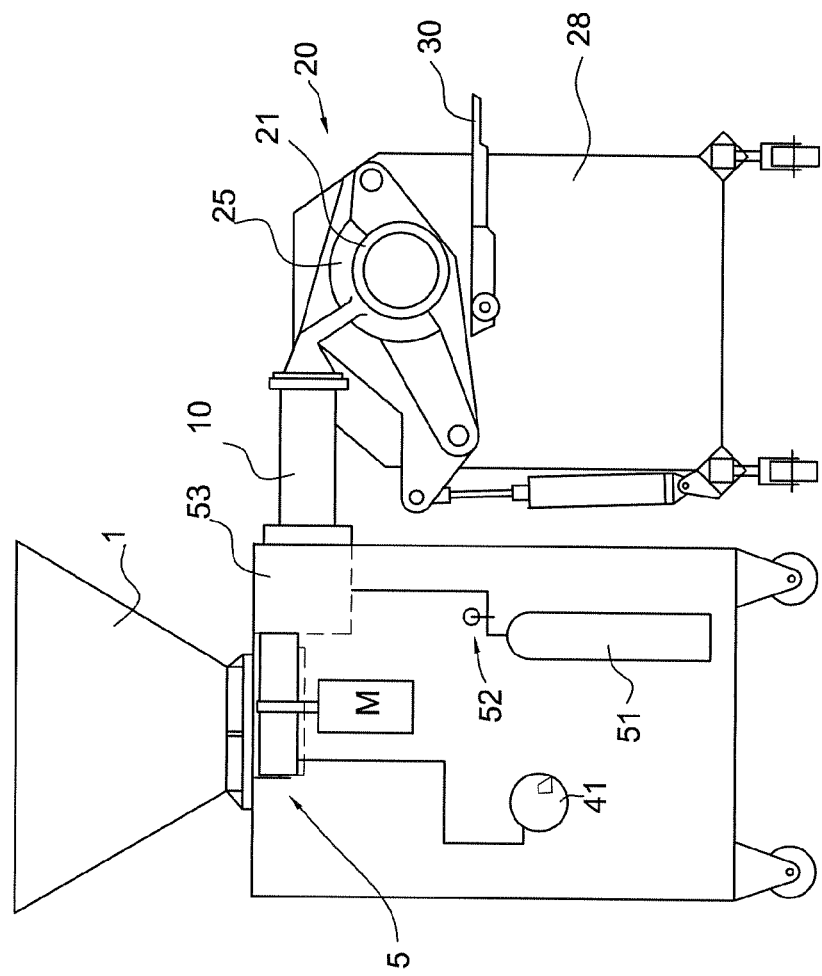

FIGS. 4 and 5 show an embodiment of an installation according to the invention, having the features discussed with reference to the schematic FIG. 1. Therefore parts identical or similar to parts discussed with reference to FIG. 1 have been denoted with the same reference numeral.

The moulding device has a frame 28, here a wheeled frame, supporting the mould drum 21.

The electronic control unit of the installation is depicted at 29.

It will be appreciated that the disclosed technique is also suitable for the production of sausages, wherein the mouth preferably is adapted to introduce the mass into the sausage casing.

Figure 6:
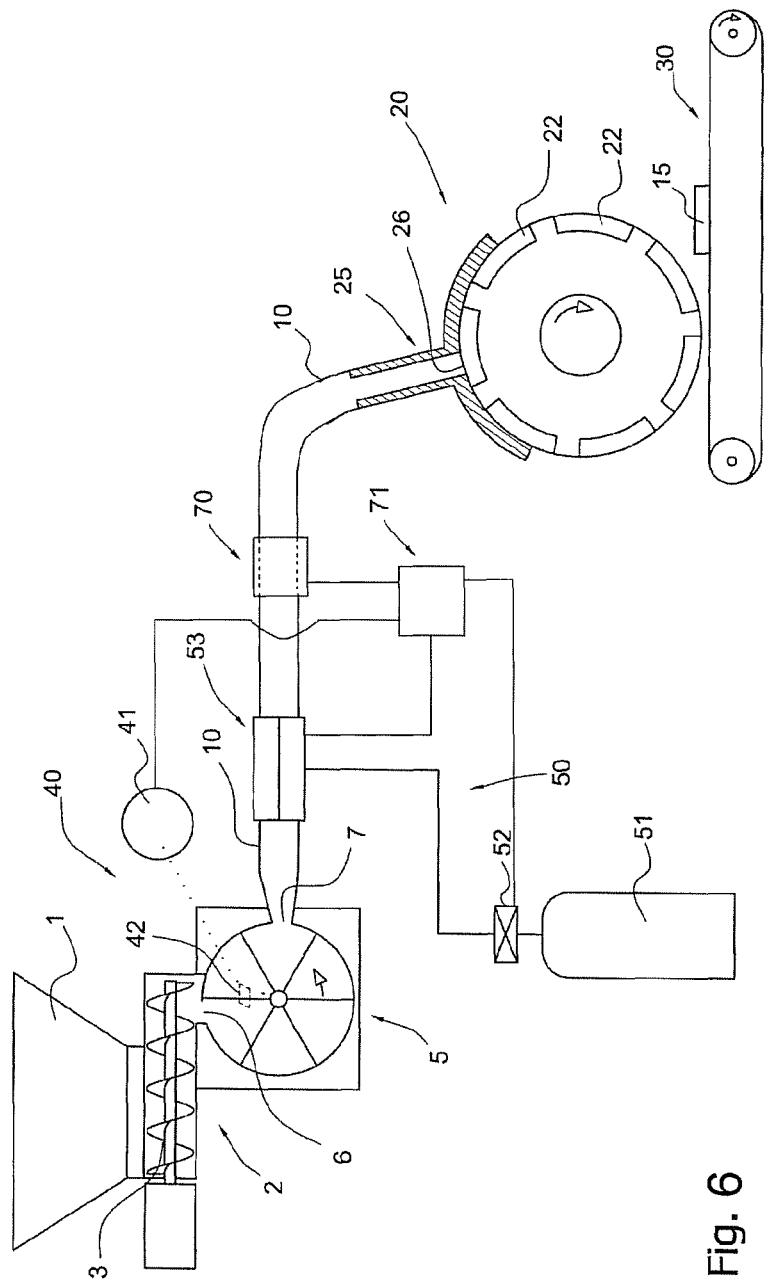

FIG. 6 shows the installation of FIG. 1 wherein an in-line determination of the mass density by a mass density measurement device 60 is envisaged, e.g. based on X-ray, Coriolis effect, air bubbles, or otherwise. The device 60 is arranged to measure the density of the pumped mass as it passes through the tube structure 10 from the pump to mouth 26. As explained this is also possible in an installation that is not equipped with a moulding device having mould cavities that pass along the mouth, e.g. as shown here or in a reciprocating plate type moulding device. The mass could then e.g. exit directly from the mouth. e.g. onto a conveyor belt, into a container, etc. As explained the mass may be a ground meat mass. Neither is it necessary that an aeration assembly 50 is employed. This is, however, a preferred feature.

The device 60 is adapted, e.g. programmed in a computerized device, to provide a signal that is representative of the mass density. This signal is here shown to be used by a control unit 71 (possibly integrated in the overall control system of the installation) which is in turn linked to at least one of: the pump 5, the vacuum assembly 40, the aeration assembly 50, in order to contribute to the operation thereof, primarily in view of the desire to be able to control the density of the mass, which ultimately has noticeable effect on the food product.

For example the control unit 71 is embodied to compare the determined density with a desired density that has been provided by an operator, e.g. based on a stored menu for the production of a certain type of food product, and provides a suitable feedback signal.

Figure 7:
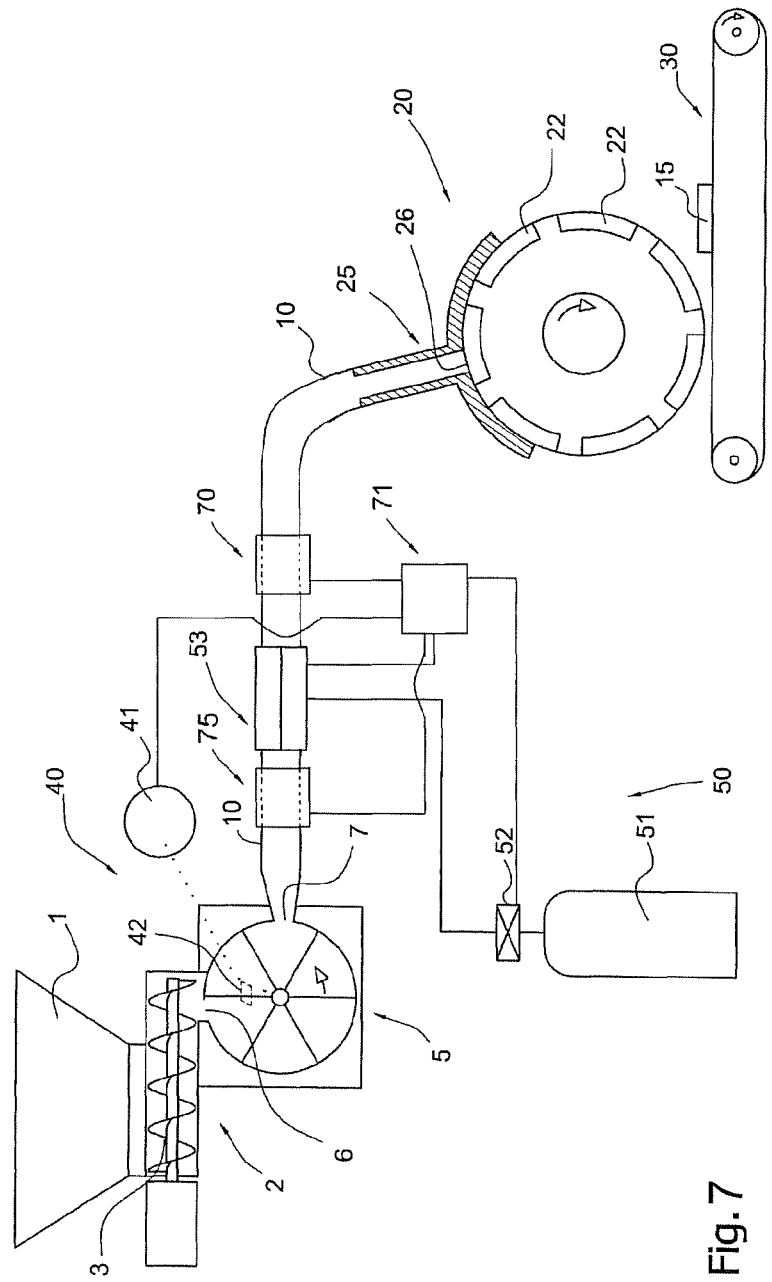
FIG. 7 depicts the installation of FIG. 6 with an additional foreign objects detection device,
FIGS. 8a and 8b schematically depict yet another installation according to the invention.

FIG. 7 shows the installation of FIG. 6, wherein it is illustrated that an X-ray device 75 is arranged between the pump 5 and the aeration member 53 in order to detect the presence of foreign objects in the pumped mass. This allows for a complete or maximum evacuation of a meat mass or other air containing mass by the vacuum assembly 40 to minimized the presence of air bubbles in the mass as it passes the X-ray device 75. As explained this enhances the detection of foreign objects compared to a situation wherein more air is present in the mass. The aeration member 53, downstream of the device 75 in the tube structure allows for a controlled aeration of the mass. e.g. with air or another gas. This approach is also beneficial in installations wherein no moulding device is present, and is in particular considered advantageous when handling ground meat.

In FIG. 7 the mass density measurement device 70 is also shown, which is done to illustrate the option to measure the mass density in the tube structure 10 at a position downstream of the aeration member 53, e.g. to control this aeration. As explained also an embodiment is envisaged wherein an X-ray device, e.g. device 70 and/or device 75, is embodied, e.g. programmed, to detect foreign objects as well as to determine mass density.

When a foreign object is detected by device 70 or 75 in the mass passing through the tube structure one can envisage a preprogrammed routine wherein a batch of formed products 15 that are made of mass near the detected object is labelled as non-suitable for further use. In another approach a discharge tube is branched from the tube structure with a valve downstream of the respective measurement device, so that a portion of mass near the detected object is led away from the path towards the mouth and discharged as rejected mass. These approaches are also possible in installation having no aeration assembly as disclosed herein.

FIGS. 8*a* and *b* illustrate an installation having components similar to the installation of FIG. 1, wherein a sample of a predetermined volume is taken from the stream of mass passing through the tube structure 10. The sampling and density determination device 110 here comprises a valve 111 adjoining at an inlet side thereof the tube structure 10 and at the other side thereof a sample chamber 112. This chamber 112 here is delimited by a cylinder wall 113 and a piston 114. With the piston 114 in a known initial position, the chamber 112 has a known initial sample volume. Care is taken that the chamber 112 is empty at the start of the process, possibly evacuated. Then the valve 111 is opened and the sample portion of mass streams into the chamber 112, The sample in the chamber 112 is still subjected to the pressure in the tube structure as it enters and fills the sample chamber 112. Then the valve 111 is closed, so that the sample chamber 112 and sample therein are no longer in communication with the tube structure 10. Then the sample is allowed to expand as the volume of the chamber is expanded and is connected to the atmosphere such that the sample is under atmospheric pressure. This is done here by releasing the piston 114 from its initial position so that the piston is allowed to move under the influence of the expanding sample of the mass. The degree of expansion of the sample, e.g. measured by the final position of the piston 114, compared to the initial sample volume is representative for the presence of air in the mass and thus for the density of the mass as the air will expand due to the reduced pressure acting on the sample. After the measurement the chamber 112 is emptied and readied for taking a new sample with the piston 114 again in its initial position.

The invention claimed is:

1. A method for processing of a ground meat mass, comprising:
   depositing a ground meat mass in a hopper,
   discharging said mass from said hopper to a positive displacement pump having an inlet and an outlet for the mass, the pump having one or more pump chambers that each are successively in communication with the pump inlet for the introduction of mass into the one or more pump chambers and with the pump outlet for the discharge of mass from the one or more pump chambers,
   expelling the mass from the outlet of the pump into a tube structure that is connected to the outlet of the positive displacement pump, said tube structure having at least one mouth from which said mass is discharged, said mass being shielded by said tube structure from the surrounding atmosphere,
   using a controllable vacuum assembly to subject the mass to a controlled evacuation of air at one or more locations in the trajectory of the mass starting from and including the hopper to and including one of the pump chambers at a position thereof where it is in communication with the pump inlet,
   subjecting the mass at one or more locations in the tube structure between the pump outlet and the mouth to a controlled introduction of a gas into the mass by a controllable aeration assembly, said aeration assembly comprising a source of pressurized gas and an aeration member that is disposed in the tube structure between the pump outlet and the mouth, said aeration member being connected to the source of pressurized gas and having one or more orifices from which said gas is emitted, and said aeration assembly comprising a gas pressure control device adapted to regulate said introduction of said gas into the mass at a controlled pressure that is at least equal to the actual pressure of the mass at the location of introduction of the gas into the mass.

2. The method according to claim 1, wherein said aeration assembly comprises an agitator member in the path of the mass and adapted to agitate said mass in order to enhance the introduction and distribution of the gas into the mass.

3. The method according to claim 2, wherein the aeration ember is integrated with the agitator member.

4. The method according to claim 2, wherein said agitator member is movably arranged in the tube structure in order to entrain the mass when the agitator member is in motion and wherein a drive motor is provided for driving said agitator member.

5. The method according to claim 4, wherein the agitator member is embodied as a meat grinder.

6. The method according to claim 1, wherein said aeration member comprises one or more porous members, each forming a multitude of orifices from which said gas is emitted into the mass.

7. The method according to claim 1, further comprising using an electronic control unit operatingly connected at least to the vacuum assembly and to the aeration assembly, wherein said electronic control unit comprises a memory that stores production settings of the evacuation by the vacuum assembly and of the aeration by the aeration assembly.

8. The method according to claim 1, wherein the mass that is discharged from said at least one mouth is fed to a shaping device which shapes the mass into three dimensional products.

9. The method according to claim 1, wherein the mass that is discharged from said at least one mouth is fed to a moulding device which comprises:
   a frame,
   a mould member having multiple mould cavities, each having a filling opening for the introduction of foodstuff material into the mould cavity,
   wherein the mould member is movably supported by the frame,
   a mould member drive for moving the mould member along a path, said path including a fill position for filling the ground meat mass into one of the mould cavities and a product release position for releasing a moulded product from the mould cavity,
   a mass feed member, preferably supported by the frame, having said mouth at the fill position along the path of the mould member, said mass feed member being connected to a fill tube of the tube structure and being adapted to transfer the mass into a mould cavity of the mould member when the filling opening thereof is in communication with the mouth at said fill position.

10. The method according to claim 1, wherein the aeration involves the introduction of a mixture of a gas and a liquid into the mass.

11. The method according to claim 1, wherein the mass that is discharged from said at least one mouth is fed to a sausage machine filling the ground meat mass into sausage casing.

12. An installation for processing of a mass of pumpable foodstuff material, said installation comprising:
   a hopper adapted to receive a batch of the mass of pumpable foodstuff material,
   a positive displacement pump configured to move ground meat, the positive displacement pump having an inlet and an outlet for the mass, the pump forming one or more pump chambers that each are successively in communication with the pump inlet for the introduction of mass into the one or more pump chambers and with the pump outlet for the discharge of mass from the one or more pump chambers,
   a tube structure connected to the outlet of the positive displacement pump, said tube structure having at least one mouth from which said mass is discharged, said mass being shielded by said tube structure from the surrounding atmosphere, a controllable vacuum assembly adapted to cause controlled evacuation of air from the mass at one or more locations in the trajectory of the mass from and including the hopper to and including a pump chamber at a position where it is in communication with the pump inlet, wherein the installation further comprises a controllable aeration assembly adapted to cause controlled introduction of a gas into the mass at one or more locations in the tube structure between the pump outlet and the mouth, said aeration assembly comprising a source of pressurized gas and an aeration member disposed in the tube structure between the pump outlet and the mouth, said aeration member being connected to the source of pressurized gas and having one or more orifices from which said gas is emitted, and said aeration assembly comprising a gas pressure control device that is adapted to regulate the introduction of said gas into the mass at a controlled pressure that is at least equal to the actual pressure of the mass at the location of introduction of the gas into the mass.

13. The installation according to claim 12, wherein said aeration assembly comprises an agitator member in the path of the mass and adapted to agitate said mass in order to enhance the introduction and distribution of the gas into the mass.

14. The installation according to claim 13, wherein the aeration member is integrated with the agitator member.

15. The installation according to claim 13, wherein said agitator member is movably arranged in the tube structure to entrain the mass when the agitator member is in motion and wherein a drive motor is provided for driving said agitator member.

16. The installation according to claim 12, wherein said aeration member comprises one or more porous members, each forming a multitude of orifices from which said gas is emitted into the mass.

17. The installation according to claim 12, comprises an electronic control unit operatingly connected at least to the vacuum assembly and to the aeration assembly, and wherein said control unit comprises a memory adapted to store production settings of the evacuation by the vacuum assembly and of the aeration by the aeration assembly.

18. The installation according to claim 12, wherein the installation further comprises a shaping device that is adapted to shape the mass emerging from the at least one mouth into three dimensional products.

19. The installation according to claim 12, wherein the installation further comprises a moulding device that is adapted to shape the mass emerging from the at least one mouth into three dimensional products, wherein the moulding device comprises:

a frame, a mould member having multiple mould cavities, each having a filling opening for the introduction of foodstuff material into the mould cavity, wherein the mould member is movably supported by the frame, a mould member drive for moving the mould member along a path, said path including a fill position for filling the mass into one of the multiple mould cavities and a product release position for releasing a moulded product from one of the multiple mould cavities, a mass feed member having said mouth at the fill position along the path of the mould member, said mass feed member being connected to a fill tube of the tube structure and being adapted to transfer the mass into one of the multiple mould cavities of the mould member when the filling opening thereof is in communication with the mouth at said fill position.

20. The installation according to claim 12, wherein the installation further comprises a sausage machine that is adapted to shape the mass emerging from the at least one mouth into sausages by filling the ground meat mass into sausage casing.

* * * * *

UNITED STATES PATENT AND TRADEMARK OFFICE
CERTIFICATE OF CORRECTION

PATENT NO. : 9,545,113 B2  
APPLICATION NO. : 14/126151  
DATED : January 17, 2017  
INVENTOR(S) : Leon Spierts et al.

Page 1 of 1

It is certified that error appears in the above-identified patent and that said Letters Patent is hereby corrected as shown below:

On the Title Page

Item (73), change "Marvell Townsend Further Processing B.V." to --Marel Townsend Further Processing B.V.--.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*